S. P. CURTIS.
CASTER WHEEL.
APPLICATION FILED JAN. 16, 1906.

908,396.

Patented Dec. 29, 1908.

WITNESSES

INVENTOR
Samuel P. Curtis
By his Atty
Myron F. Hill

UNITED STATES PATENT OFFICE.

SAMUEL P. CURTIS, OF BOSTON, MASSACHUSETTS.

CASTER-WHEEL.

No. 908,396.   Specification of Letters Patent.   Patented Dec. 29, 1908.

Application filed January 16, 1906. Serial No. 296,422.

*To all whom it may concern:*

Be it known that I, SAMUEL P. CURTIS, of Boston, in the county of Suffolk and State of Massachusetts, have invented certain new and useful Improvements in Caster-Wheels, of which the following is a specification.

The object of my invention is an article of manufacture, a caster for furniture, having a wheel so constructed as to eliminate the trouble caused by casters of wood or metal when rolled over polished floors or coverings. Various efforts have hitherto been made to accomplish this object, which have not been completely successful. Soft rubber has been used for wheels of casters, and soft leather as well. These mark a polished floor, and by reason of their softness, which extends throughout their body, incresase the difficulty of moving furniture about, and are soon destroyed; or if left alone, in time harden in distorted shape. Such wheels are homogeneous both in material and density. In fact all caster wheels heretofore constructed may be thus described, whether wood, metal, rubber or leather.

I have discovered that a wheel of hard compressed felt, with a somewhat soft surface, will not change its condition after years of service, will support heavy weights without material compression, and removes the troubles of casters above enumerated. In fact the wheels of my casters are homogeneous only in material and not in density.

Figure 1:
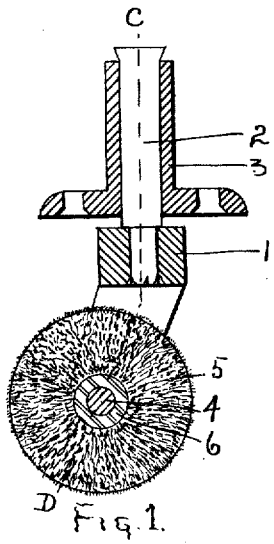
Figure 2:
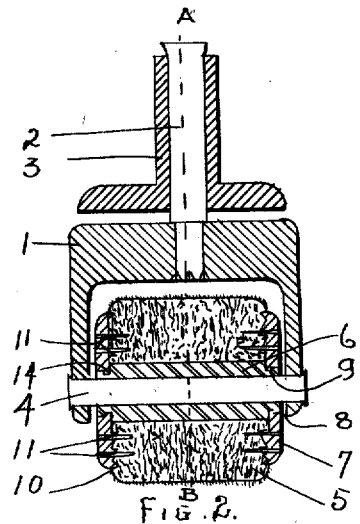
Figure 3:
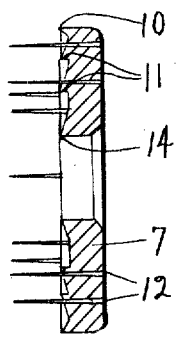
Figure 4:
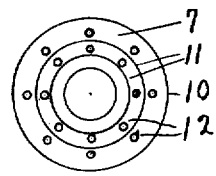

In the drawings, Figure 1 is a section on line A—B Fig. 2. Fig. 2 is a section on line C—D Fig. 1. Fig. 3 is an enlarged section of one of the washers between which my felt wheel is mounted. Fig. 4 is a face view of the same.

In Figs. 1 and 2, a yoke or horn 1 is provided with a spindle 2 and socket 3. The horn carries a pin 4, riveted to its arms in any well known way. The wheel 5 composed of felt, hardened into a solid mass, with a somewhat soft circumferential surface or tread, is mounted upon a sleeve or bushing 6 to provide it with a suitable bearing. The wheel is held between retaining walls or washers 7 securely fastened so as to bind the felt body between them.

In Fig. 3 the washers 7 are shown provided with burred edges 10, separated ridges 11, and pins 12 to additionally secure the felt wheel in place.

In the drawing the washers are shown to be riveted as follows: The end of the sleeve 6 may be provided with a shoulder 8, and a groove 9. When the washer is slipped on to the end of the sleeve, and put under a press the bur 14 is mashed into the groove 9, this securely riveting the parts together.

The felt is preferably hardened by being sized and compressed while drying in a hydraulic press. Thus it acquires a hard body substantially incapable of compression under the weights it sustains, and the circumferential surface or tread, the part which touches the floor, is somewhat softened to afford a soft harmless contact with the floor.

What I claim is:

1. In a caster, a horn, a pin, and a wheel comprising a sleeve, a circular body of hard felt mounted upon said sleeve, and retaining washers for binding said body between them, the tread of said felt body providing a somewhat soft contact surface to rest upon the floor.

2. In combination, in a caster, a horn, and a wheel comprising a circular body of hard felt, and retaining washers for binding said body between them, said wheel being mounted upon a bearing in said horn, the tread of said felt body providing a somewhat soft contact surface to rest upon the floor.

In testimony whereof I have affixed my signature, in presence of two witnesses.

SAMUEL P. CURTIS.

Witnesses:
MYRON F. HILL,
ALBERT H. HYDE.